United States Patent
Schmidt

(10) Patent No.: US 7,082,855 B2
(45) Date of Patent: Aug. 1, 2006

(54) DUAL-MASS FLYWHEEL

(75) Inventor: Andreas Schmidt, Vlotho (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 10/852,962

(22) Filed: May 24, 2004

(65) Prior Publication Data

US 2004/0255719 A1 Dec. 23, 2004

Related U.S. Application Data

(63) Continuation of application No. PCT/EP02/12413, filed on Nov. 7, 2002.

(30) Foreign Application Priority Data

Nov. 23, 2001 (DE) .......................................... 101 57 397

(51) Int. Cl.
*F16F 15/10* (2006.01)
*F16F 15/131* (2006.01)

(52) U.S. Cl. .......................... 74/574; 74/572; 192/201; 464/66; 464/68

(58) Field of Classification Search .................... 74/572, 74/573 R, 574; 192/201; 464/66, 68
See application file for complete search history.

(56) References Cited

U.S. PATENT DOCUMENTS

| | | | | |
|---|---|---|---|---|
| 5,367,920 A | * | 11/1994 | Bonfilio | ........................ 74/574 |
| 5,471,896 A | | 12/1995 | Schierling et al. | |
| 5,476,166 A | * | 12/1995 | Schierling et al. | ........ 192/70.14 |
| 5,518,100 A | * | 5/1996 | Birk et al. | .................... 192/208 |
| 5,575,183 A | * | 11/1996 | Schierling et al. | ............. 74/574 |
| 5,617,940 A | | 4/1997 | Fukushima et al. | |
| 5,711,406 A | | 1/1998 | Lindner et al. | |
| 6,014,912 A | | 1/2000 | Carlson | |
| 2001/0025762 A1 | | 10/2001 | Schauder et al. | |

FOREIGN PATENT DOCUMENTS

| | | | |
|---|---|---|---|
| DE | 43 39 421 A1 | 6/1994 | |
| DE | 44 28 829 A1 | 2/1996 | |
| DE | 100 04 125 A1 | 8/2001 | |
| GB | 2277791 A1 * | 11/1994 | ................... 74/574 |
| JP | 09 166 180 | 6/1997 | |

OTHER PUBLICATIONS

Merriam–Webster's Collegiate Dictionary, Tenth Edition, 1999, pp. 129 and 1012.*

* cited by examiner

*Primary Examiner*—Vinh T. Luong

(57) ABSTRACT

A dual-mass flywheel includes a primary-side first sheet-metal shaped part configured to be fastened centrically with respect to an axis of rotation. The primary-side first sheet-metal shaped part contributes to a primary mass. A secondary-side second sheet-metal shaped part is mounted rotatably about the axis of rotation in relation to the primary-side first sheet-metal shaped part. The second sheet-metal shaped part contributes to a secondary mass. A torsion damper device connects the primary-side first sheet-metal shaped part and the secondary-side second sheet-metal shaped part to one another in a torsionally elastic manner. A mass ring with a large diameter contributes to the secondary mass. A sheet metal element connects the mass ring directly to the secondary-side second sheet-metal shaped part at a small diameter.

10 Claims, 2 Drawing Sheets

DUAL-MASS FLYWHEEL

CROSS-REFERENCE TO RELATED APPLICATION

This application is a continuation, under 35 U.S.C. §120, of copending international application No. PCT/EP02/12413, filed Nov. 7, 2002, which designated the United States; this application also claims the priority, under 35 U.S.C. §119, of German patent application No. 101 57 397.9, filed Nov. 23, 2001; the prior applications are herewith incorporated by reference in their entirety.

BACKGROUND OF THE INVENTION

Field of the Invention

The invention relates to a dual-mass flywheel, in particular for a drive train of a motor vehicle.

In a drive train of a motor vehicle, a dual-mass flywheel (DMF) has the task of damping torsional vibrations of the engine such that the torsional vibrations are not transferred to the transmission. For this purpose, the dual-mass flywheel has a primary mass and a secondary mass. The primary mass can be fastened to the crankshaft of the internal combustion engine such that the dual-mass flywheel is fastened centrically with respect to the axis of rotation of the crankshaft. The dual-mass flywheel further has a secondary mass mounted rotatably about the axis of rotation in relation to the primary mass. The primary mass and secondary mass are connected to one another in a torsionally elastic manner via a torsion damper device. Damping is achieved through the use of relatively high mass inertias of the primary and secondary masses. The secondary mass is connected to the clutch, for example, through the use of a driving disk connected via toothings that can be plugged into one another.

Published, Non-Prosecuted German Patent Application No. DE 43 39 421 A1 describes a dual-mass flywheel with a primary-side first sheet-metal shaped part which can be fastened centrically with respect to the axis of rotation of a crankshaft of the internal combustion engine of a motor vehicle and which contributes to a primary mass, with a secondary-side second sheet-metal shaped part which is mounted rotatably about the axis of rotation in relation to the primary-side first sheet-metal shaped part and which contributes to a secondary mass, and with a torsion damper device connecting the primary-side first sheet-metal shaped part and the secondary-side second sheet-metal shaped part to one another in a torsionally elastic manner. In this case, additional masses for increasing the primary mass are provided at special locations.

It is expedient to have not only a high primary mass, but also a high secondary mass. As a rule, the secondary mass is not only formed in the actual two-mass flywheel subassembly, but components of an adjacent subassembly, which are connected firmly to the secondary side of the dual-mass flywheel, are also utilized in order to increase this secondary mass. In the case of a manual shift transmission, for example, the adjacent subassembly is a dry clutch whose engine-side components can increase the secondary mass. This has the disadvantage, however, in the case of a secondary mass connected to the clutch via a plug-type toothing such as a spline toothing, that two toothings, which have a play and contact the driving disk component, lie between the actual secondary side of the dual-mass flywheel and an outer clutch plate carrier of the clutch. The result of this, on the one hand, is that the effectiveness of the secondary mass of the outer clutch plate carrier or outer multi-disc carrier is reduced and, on the other hand, that there is the risk of a deformation, deflection or wear of the toothings on the driving disk.

SUMMARY OF THE INVENTION

It is accordingly an object of the invention to provide a dual-mass flywheel which overcomes the above-mentioned disadvantages of the heretofore-known dual-mass flywheels of this general type and which provides an increased secondary mass.

With the foregoing and other objects in view there is provided, in accordance with the invention, a dual-mass flywheel configuration, including:

a primary-side first sheet-metal shaped part configured to be fastened centrically with respect to an axis of rotation, the primary-side first sheet-metal shaped part contributing to a primary mass;

a secondary-side second sheet-metal shaped part mounted rotatably about the axis of rotation in relation to the primary-side first sheet-metal shaped part, the secondary-side second sheet-metal shaped part contributing to a secondary mass;

a torsion damper device connecting the primary-side first sheet-metal shaped part and the secondary-side second sheet-metal shaped part to one another in a torsionally elastic manner;

a mass ring contributing to the secondary mass, the mass ring having a relatively larger diameter; and a sheet metal element fastening the mass ring directly to the secondary-side second sheet-metal shaped part at a relatively smaller diameter.

In other words, according to the invention, there is provided, a dual-mass flywheel, in particular for the drive train of a motor vehicle, with a primary-side first sheet-metal shaped part fastenable centrically with respect to the axis of rotation of a crankshaft of the engine, the first sheet-metal part contributing to a primary mass, with a secondary-side second sheet-metal shaped part mounted rotatably about the axis of rotation in relation to the primary-side first sheet-metal shaped part, the second sheet-metal shaped part contributing to a secondary mass, and with a torsion damper device connecting the primary-side first sheet-metal shaped part and the secondary-side second sheet-metal shaped part to one another in a torsionally elastic manner, wherein an additional secondary mass in the form of a mass ring of large diameter is connected directly to the secondary-side second sheet-metal shaped part at a smaller diameter via a sheet metal element.

According to another feature of the invention, the sheet metal element is connected to the secondary-side second sheet-metal shaped part via a riveted connection or a screw connection.

According to yet another feature of the invention, the secondary-side second sheet-metal shaped part is connected, via a driving disk, to an outer clutch plate carrier such as a multi-plate carrier.

According to a further feature of the invention, at least one toothing is provided between the secondary-side second sheet-metal shaped part and the outer clutch plate carrier.

According to yet a further feature of the invention, the sheet metal element and the driving disk are configured to extend on respective opposite sides of a transmission cover.

According to another feature of the invention, the sheet metal element and the secondary-side second sheet-metal shaped part are a one-piece element.

With the objects of the invention in view, there is further provided, in combination with a vehicle drive train having an engine crankshaft and a transmission, the engine crankshaft having an axis of rotation and defining a primary side, the transmission defining a secondary side, a dual-mass flywheel, including:

a primary-side first sheet-metal shaped part configured to be fastened centrically with respect to the axis of rotation of the engine crankshaft, the primary-side first sheet-metal shaped part contributing to a primary mass;

a secondary-side second sheet-metal shaped part mounted rotatably about the axis of rotation of the engine crankshaft in relation to the primary-side first sheet-metal shaped part, the secondary-side second sheet-metal shaped part contributing to a secondary mass;

a torsion damper device connecting the primary-side first sheet-metal shaped part and the secondary-side second sheet-metal shaped part to one another in a torsionally elastic manner;

a mass ring contributing to the secondary mass, the mass ring having a relatively larger diameter; and a sheet metal element fastening the mass ring directly to the secondary-side second sheet-metal shaped part at a relatively smaller diameter.

The advantage of tying up or fastening the additional secondary mass in the form of a mass ring of large diameter directly to the secondary-side second sheet-metal shaped part at a smaller diameter via a metal sheet is that the high moment of inertia lies upstream of the toothings and these toothings are consequently relived of stress. Due to the large mass ring being fastened at a small diameter through the use of a thin metal sheet, the secondary mass can be increased even in critical axial construction spaces.

Other features which are considered as characteristic for the invention are set forth in the appended claims.

Although the invention is illustrated and described herein as embodied in a dual-mass flywheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
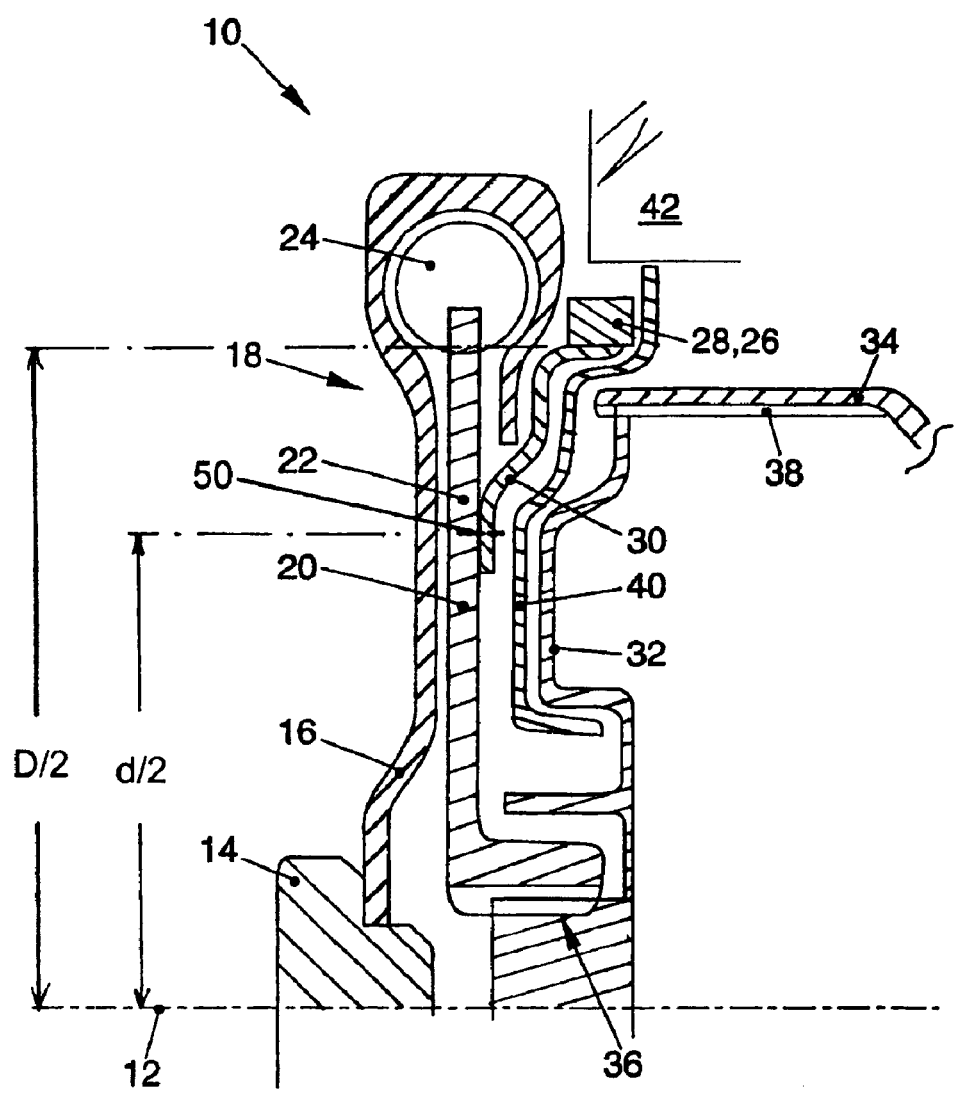
FIG. 1 is a partial diagrammatic axial longitudinal sectional view of a dual-mass flywheel according to the invention.

Referring now to the figures of the drawings in detail and first, particularly, to FIG. 1 thereof, there is shown an axial longitudinal sect ion through the upper half of a dual-mass flywheel 10 disposed centrically with respect to an axis of rotation 12 of a partially, diagrammatically shown crankshaft 14 of the internal combustion engine of a motor vehicle. A primary-side first sheet-metal shaped part 16 of the dual-mass flywheel 10 is fastened to the crankshaft 14 and contributes to a primary mass 18. A secondary-side second sheet-metal shaped part 20 of the dual-mass flywheel 10 is mounted rotatably about the axis of rotation 12 in relation to the primary-side first sheet-metal shaped part 16 and contributes to a secondary mass 22. A torsion damper device 24 connects the primary-side first sheet-metal shaped part 16 and the secondary-side second sheet-metal shaped part 20 to one another in a torsionally elastic manner.

An additional secondary mass 26, in the form of a mass ring 28 of large diameter, is fastened directly to the secondary-side second sheet-metal shaped part 20 at a smaller diameter via a metal sheet 30. The mass ring 28 has an inner diameter D extending perpendicular to the axis of rotation 12. The sheet metal element 30 fastens the mass ring 28 to the secondary-side second sheet-metal shaped part 20 at a diameter d that is smaller than the inner diameter D of the mass ring 28. The secondary-side second sheet-metal shaped part 20 is connected to an outer clutch plate carrier 34 of a clutch via a driving disk 32. This connection has two toothings 36, 38. The metal sheet 30 and the driving disk 32 extend on different sides of a transmission cover 40 of a merely schematically indicated transmission 42.

The advantage of connecting the additional secondary mass 26 in the form of a mass ring 28 of large diameter directly to the secondary-side second sheet-metal shaped part 20 at a smaller diameter via a metal sheet 30 is that the high moment of inertia lies upstream of the toothings 36, 38 and these are consequently relieved of stress. By the large mass ring 28 being tied up to a small diameter through the use of a thin metal sheet 30, the secondary mass can be increased even in the case of critical axial construction spaces.

Figure 2:
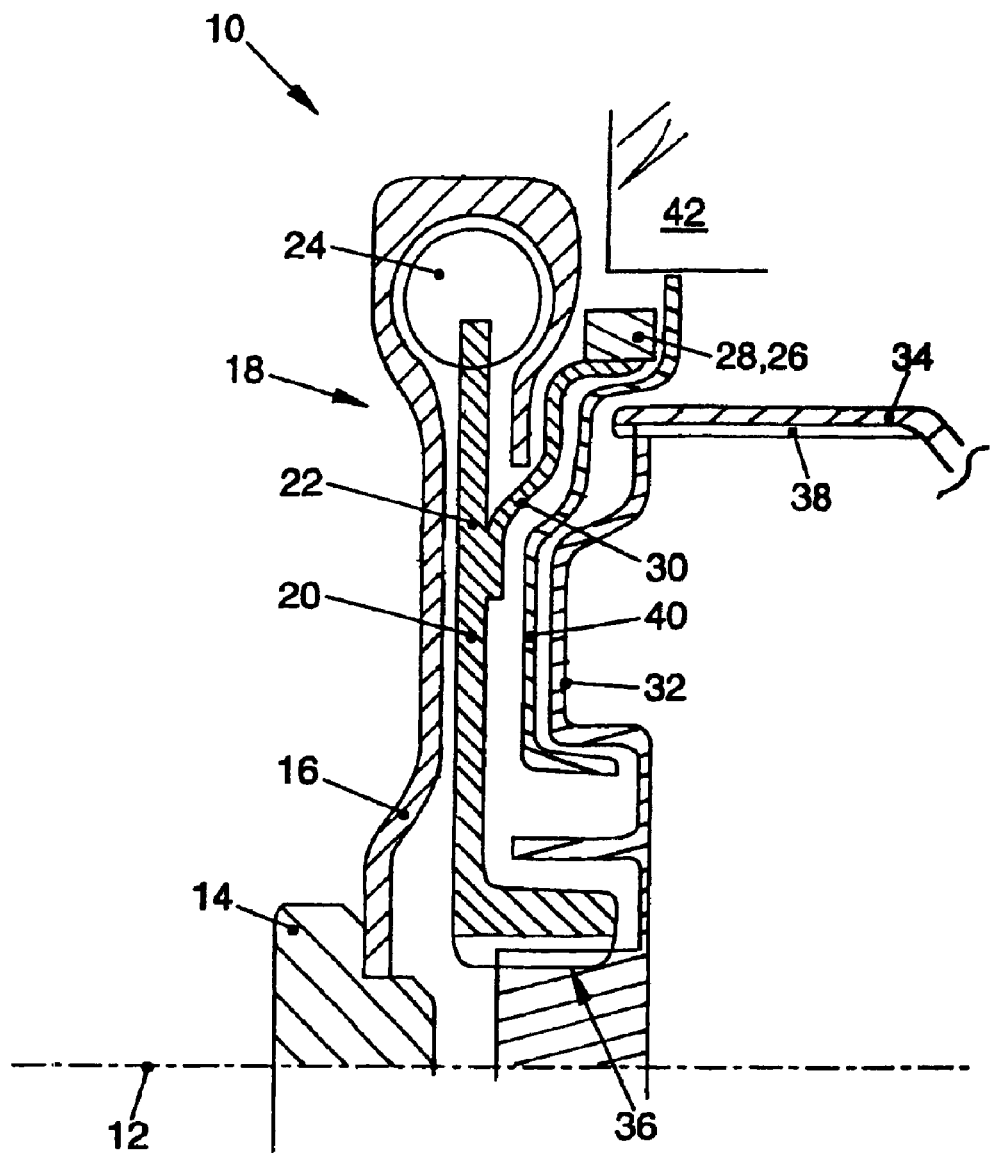
FIG. 2 is a partial diagrammatic axial longitudinal sectional view of further embodiment of a dual-mass flywheel according to the invention.

The metal sheet 30 is connected to the secondary-side sheet-metal shaped part 20 preferably through the use of a riveted connection which is only schematically indicated by a dashed line 50. Alternatively, the metal sheet 30 may be connected to the secondary-side second sheet-metal shaped part 20 through the use of a screw connection which is also only schematically indicated by the dashed line 50. Other types of fastening, such as soldering, adhesive bonding, welding or clinching, may also be provided. The metal sheet 30 and the secondary-side sheet-metal shaped part 20 may also be produced in one piece as is illustrated in FIG. 2.

To simplify the illustration, the fastening devices are only schematically illustrated and some elements such as seals are not depicted, since a person skilled in the art provides them in the customary positions.

I claim:

1. A dual-mass flywheel configuration, comprising:

a primary-side first sheet-metal shaped part configured to be fastened centrically with respect to an axis of rotation, said primary-side first sheet-metal shaped part contributing to a primary mass;

a secondary-side second sheet-metal shaped part mounted rotatably about the axis of rotation in relation to said primary-side first sheet-metal shaped part, said secondary-side side second sheet-metal shaped part contributing to a secondary mass;

a torsion damper device connecting said primary-side first sheet-metal shaped part and said secondary-side second sheet-metal shaped part to one another in a torsionally elastic manner;

a driving disk connecting said secondary-side second sheet-metal shaped part to an outer clutch plate carrier of a clutch, and at least one toothing between said secondary-side second sheet-metal shaped part and the outer clutch plate carrier;

a mass ring contributing to the secondary mass, said mass ring having an inner diameter extending perpendicular to the axis of rotation; and a sheet metal element fastening said mass ring directly to said secondary-side second sheet-metal shaped part at a diameter smaller than the inner diameter of said mass ring.

2. The dual-mass flywheel configuration according to claim 1, wherein said sheet metal element is connected to said secondary-side second sheet-metal shaped part via a riveted connection.

3. The dual-mass flywheel configuration according to claim 1, wherein said sheet metal element is connected to said secondary-side second sheet-metal shaped part via a screw connection.

4. The dual-mass flywheel configuration according to claim 1, wherein said sheet metal element and said driving disk are configured to extend on respective opposite sides of a transmission cover.

5. The dual-mass flywheel configuration according to claim 1, wherein said sheet metal element and said secondary-side second sheet-metal shaped part are a one-piece element.

6. In combination with a vehicle drive train having an engine crankshaft and a transmission, the engine crankshaft having an axis of rotation and defining a primary side, the transmission defining a secondary side, a dual-mass flywheel, comprising:

a primary-side first sheet-metal shaped part configured to be fastened centrically with respect to the axis of rotation of the engine crankshaft, said primary-side first sheet-metal shaped part contributing to a primary mass;

a secondary-side second sheet-metal shaped part mounted rotatably about the axis of rotation of the engine crankshaft in relation to said primary-side first sheet-metal shaped part, said secondary-side second sheet-metal shaped part contributing to a secondary mass;

a torsion damper device connecting said primary-side first sheet-metal shaped part and said secondary-side second sheet-metal shaped part to one another in a torsionally elastic manner;

a driving disk connecting said secondary-side second sheet-metal shaped part to an outer clutch plate carrier of a clutch, and at least one toothing between said secondary-side second sheet-metal shaped part and the outer clutch plate carrier;

a mass ring contributing to the secondary mass, said mass ring having an inner diameter extending perpendicular to the axis of rotation; and a sheet metal element fastening said mass ring directly to said secondary-side second sheet-metal shaped part at a diameter smaller than the inner diameter of said mass ring.

7. The dual-mass flywheel according to claim 6, wherein said sheet metal element is connected to said secondary-side second sheet-metal shaped part via a riveted connection.

8. The dual-mass flywheel according to claim 6, wherein said sheet metal element is connected to said secondary-side second sheet-metal shaped part via a screw connection.

9. The dual-mass flywheel according to claim 6, wherein the transmission has a transmission cover, said sheet metal element and said driving disk extend on respective opposite sides of the transmission cover.

10. The dual-mass flywheel according to claim 6, wherein said sheet metal element and said secondary-side second sheet-metal shaped part are a one-piece element.

* * * * *